United States Patent
Canta et al.

(10) Patent No.: US 6,996,490 B2
(45) Date of Patent: Feb. 7, 2006

(54) THERMAL COMFORT SENSOR DEVICE AND AN ANTHROPOMORPHIC DUMMY FOR SIMULATING HEAT EXCHANGE WHICH INCLUDES A PLURALITY OF SUCH DEVICES

(75) Inventors: Carlo Canta, Turin (IT); Carloandrea Malvicino, Turin (IT)

(73) Assignee: C.R.F. Societa' Consortile per Azioni, Orbassano (IT)

( * ) Notice: Subject to any disclaimer, the term of this patent is extended or adjusted under 35 U.S.C. 154(b) by 21 days.

(21) Appl. No.: 10/498,995

(22) PCT Filed: Dec. 16, 2002

(86) PCT No.: PCT/EP02/14313

§ 371 (c)(1),
(2), (4) Date: Jun. 18, 2004

(87) PCT Pub. No.: WO03/052461

PCT Pub. Date: Jun. 26, 2003

(65) Prior Publication Data

US 2005/0126280 A1 Jun. 16, 2005

(30) Foreign Application Priority Data

Dec. 18, 2001 (IT) .......................... TO2001A1182

(51) Int. Cl.
*G01K 1/00* (2006.01)
*G01F 1/00* (2006.01)

(52) U.S. Cl. .................. 702/130; 702/45; 374/208
(58) Field of Classification Search ............... 702/130, 702/136, 131, 132, 45; 374/29, 40, 208, 374/133

See application file for complete search history.

(56) References Cited

U.S. PATENT DOCUMENTS

| 3,933,045 A | * | 1/1976 | Fox et al. ................... 374/134 |
| 4,905,513 A | | 3/1990 | Burgos |
| 5,040,416 A | | 8/1991 | Demisch et al. |
| 5,560,711 A | | 10/1996 | Bu |

FOREIGN PATENT DOCUMENTS

| DE | 36 11 084 A1 | 10/1987 |
| DE | 39 22 854 A1 | 1/1991 |

* cited by examiner

*Primary Examiner*—Bryan Bui
*Assistant Examiner*—Meagan S Walling
(74) *Attorney, Agent, or Firm*—Sughrue Mion, PLLC

(57) ABSTRACT

The sensor device (S), in particular for use in a simulator dummy of an anthropomorphic type (M), includes a heat insulating support structure (1) with two measuring areas (1d; 1e) formed on the same side thereof, each having a measuring device ($D_A$, $D_B$) disposed thereon which includes an electric heater (2) and an electronic thermal flow sensor device (3) and an associated electric temperature sensor (4), arranged above the heater (2). The structure (1) also has an associated flow-speed sensor device (AS), preferably arranged in an intermediate area between the measuring devices ($D_A$, $D_B$), for supplying signals during operation indicating the speed of the air flow in the vicinity. The device (S) also includes an electronic acquisition and control unit (ACE) set to control operation of the heaters (2) according to predetermined instructions and/or to receive signals emitted by the aforesaid sensors (3, 4, AS).

10 Claims, 5 Drawing Sheets

THERMAL COMFORT SENSOR DEVICE AND AN ANTHROPOMORPHIC DUMMY FOR SIMULATING HEAT EXCHANGE WHICH INCLUDES A PLURALITY OF SUCH DEVICES

This is a National Stage entry of application Ser. No. PCT/EP02/14313 filed Dec. 18, 2001; the disclosure of which is incorporated herein by reference.

BACKGROUND OF THE INVENTION

The present invention relates to a thermal comfort sensor device of the kind defined in the preamble of claim 1, usable in particular for evaluating the sensation of warmth perceived by an occupant of the passenger compartment of a motor vehicle.

The perception of body warmth is dependent on heat exchange between the human body and the surrounding environment. The human body tends to dissipate the heat generated by its metabolism. The physiological reactions (vasodilatation, vasoconstriction, sweating etc.) that take place in order to regulate the flow of heat exchanged between the body-and the environment can cause thermal discomfort.

U.S. Pat. No. 5,560,711 discloses a sensor device of the above-identified kind comprising two diaphragms, each forming a central membrane with 2 to 3 $\mu$m thickness, bonded to one another through an adhesive to form an air cavity therebetween. The membrane of the lower diaphragm includes a thin film heater and a thin film temperature sensor. The membrane of the upper diaphragm includes two series-connected thermocouples operating to sense a skin temperature condition, a room temperature sensor and a black body layer formed on the latter. The sensor device provides in use an output voltage which depends on the air flow rate.

DE-39 22 854-A1 discloses arrangement for providing a measure of thermal comfort in an environment having a conditioned climate. The arrangement includes separate sensors applied in specific locations on an anthropomorphic dummy. Said sensors include air flow speed sensors.

In order to evaluate heat sensation in a particular environment, such as the passenger compartment of a motor vehicle, anthropomorphic dummies with sensors have been proposed and manufactured which are able to measure the values assumed by certain predetermined physical quantities which contribute to the perceived heat sensation. Such dummies are usually jointed so they can be arranged in typical postures of the driver or passengers of a motor vehicle.

In the passenger compartment of a motor vehicle, or in any seated position, the human body exchanges heat through contact with the seat and with the surrounding air.

SUMMARY OF THE INVENTION

The object of the present invention is to provide a thermal comfort sensor which can be used in order to evaluate heat sensation in a particular environment, and which can be used in particular in an anthropomorphic simulation dummy.

By using such sensors it is possible to manufacture a dummy equipped with sensors to measure heat sensations caused only by the air in the surrounding environment. With this aim in mind, the dummy will be light and therefore easy to handle, since it does not need to have the physical weight of a real person.

This and other objects are achieved according to the invention by providing a sensor device of which the main characteristics are defined in the appended claim 1., The simulator also comprehends an anthropomorphic simulator dummy which includes a plurality of such thermal comfort sensors.

Further characteristics and advantages of the invention will become apparent from the detailed description which follows, provided purely by way of non-limitative example, with reference to the appended drawings, in which:

DETAILED DESCRIPTION OF THE INVENTION

Figure 1:
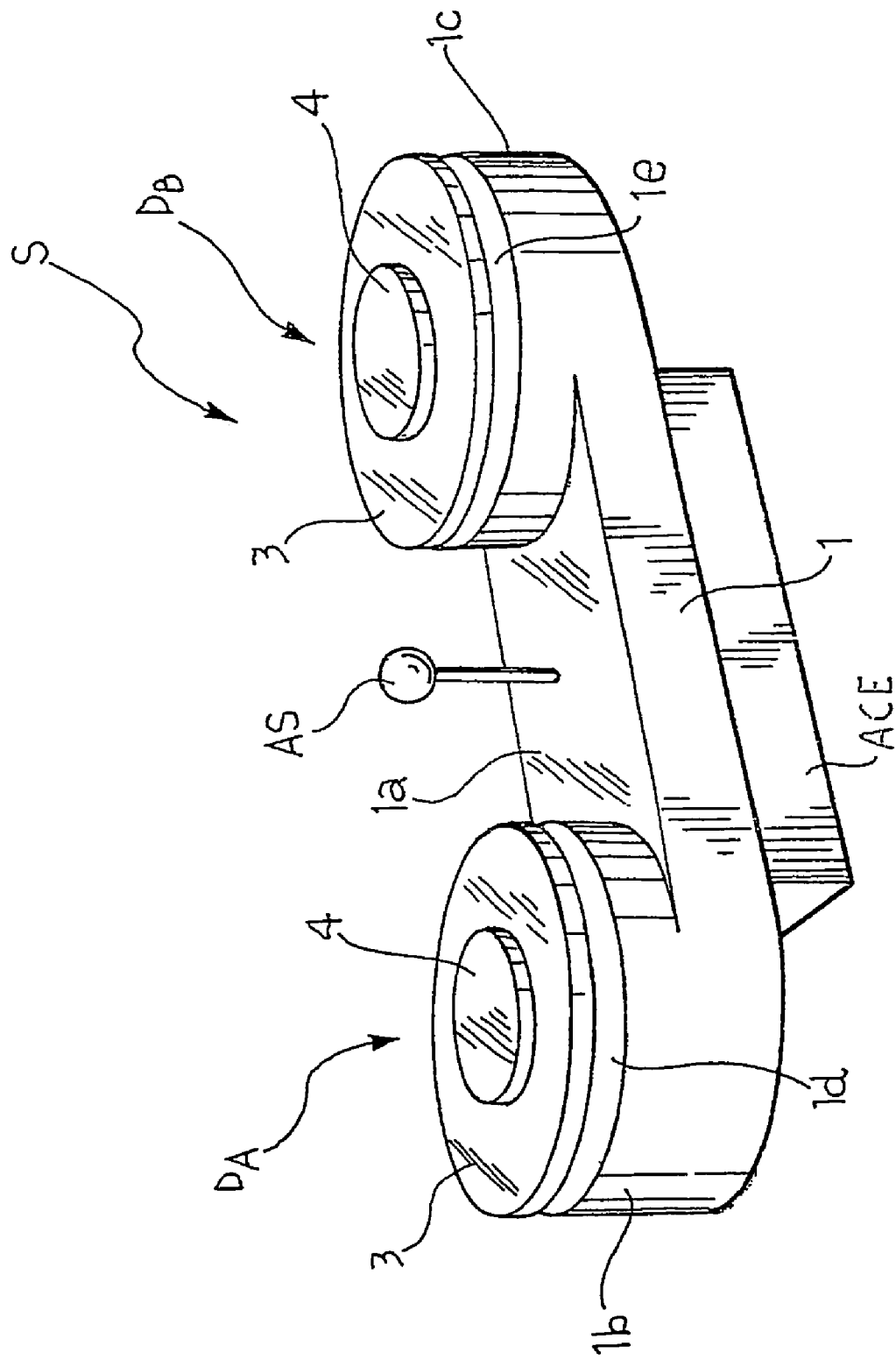
FIG. 1 is a perspective view of a thermal comfort sensor device according to the invention.
Figure 2:
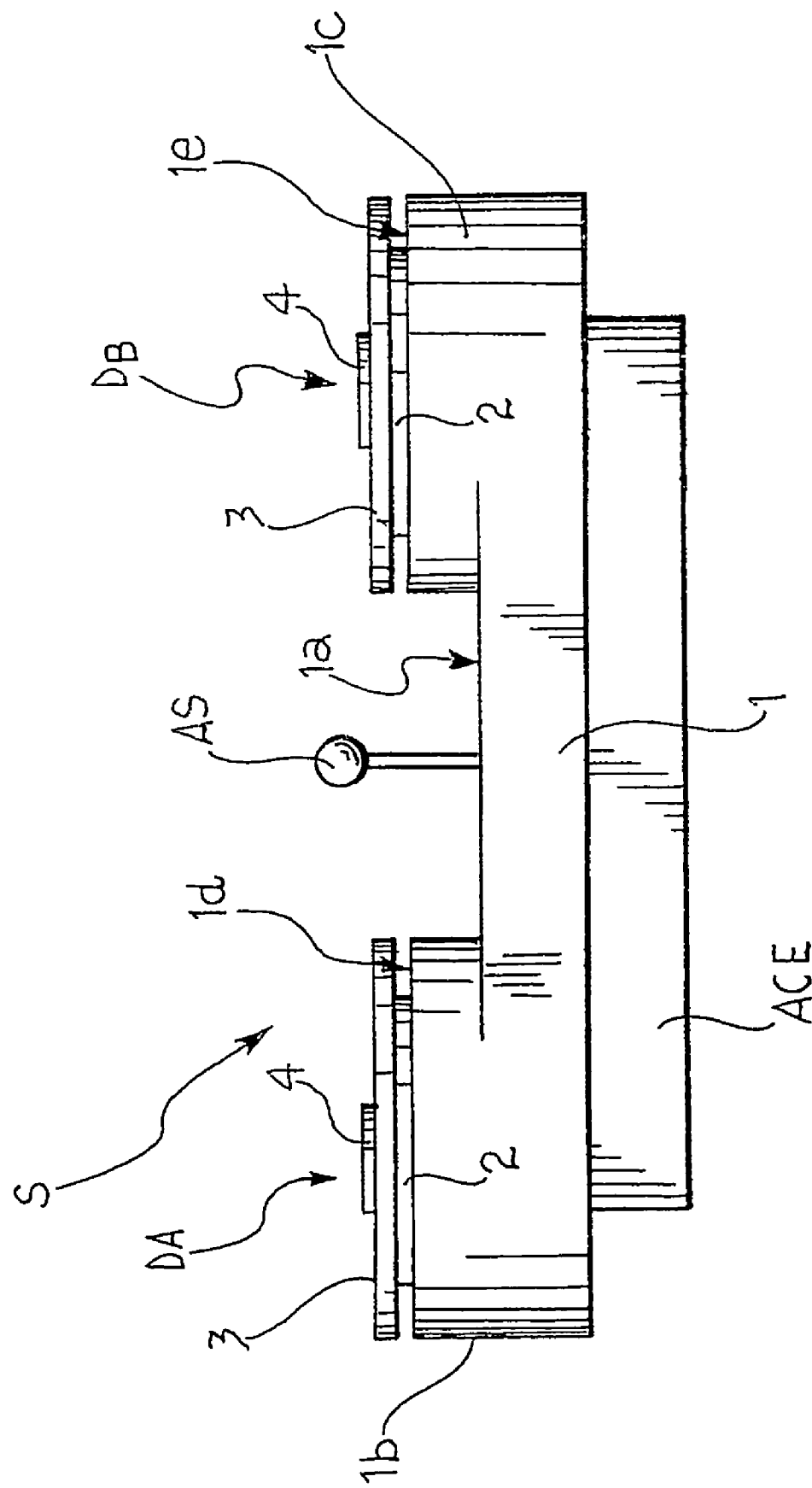
FIG. 2 is a side view of the said sensor, viewed in the direction of the arrow II of FIG. 1.

With reference to the drawings, a thermal comfort sensor according to the invention is generally indicated S in FIGS. 1 and 2.

As will become more apparent below, the sensor S is made in such a way as to operate as a surface or "skin" sensor in a dummy for simulating heat exchange.

The skin is the organ through which the human body exchanges with the surrounding environment the greater portion of heat or thermal energy produced by metabolism, in a manner which depends on the characteristics of each individual human being, as well as on the type and the intensity of the activity being undertaken. The exchange of thermal energy between a human body and the air of the surrounding environment occurs essentially by convection and radiation. As noted earlier, the human body has a heat regulation "mechanism" whereby skin temperature is regulated by means of blood circulation (vasodilatation, vasoconstriction) and of sweating.

The thermal comfort sensor S of the invention simulates the thermal behaviour of a portion of the skin of a human body, except with regard to the phenomenon of perspiration or sweating. In any event, the effect of sweating on skin temperature can be estimated by using mathematical models and data on relative humidity and on local air speed.

The thermal comfort sensor S includes a support structure 1 of a heat insulating material such as Polipan, for example.

In the embodiment illustrated by way of example, the support structure 1 includes an intermediate portion 1a, in the shape of a thin plate, which extends between two end portions 1b and 1c which are thicker, so as to form two raised measuring surfaces 1d and 1e on the same side of the structure 1.

Each measuring surface 1d and 1e has a respective measuring device $D_A$, $D_B$ applied to it.

As can be seen best from FIG. 2, each measuring device $D_A$, $D_B$ includes an electric heater 2 which is carried directly by the support structure 1.

The said heater devices 2 are of a type known per se, for example of a type which includes a disc substrate of an electrically insulating and thermal insulating material with a heating resistor applied thereto.

The measuring devices $D_A$ and $D_B$ also each include a respective thermal flow sensor 3 and an associated temperature sensor 4, positioned over their respective heater 2, on the opposite side from the support structure 1.

In the embodiment illustrated by way of example in FIGS. 1 and 2, the thermal flow sensor in each measuring device $D_A$ or $D_B$ is fixed to the respective heater 2 while the associated temperature sensor 4 is itself fixed over the thermal flow sensor 3. In such an arrangement, the thermal flow sensors 3 can be of a thermopile type, being thus able to produce voltage in dependence on the $W/m^2$ flowing through them.

The temperature sensors 4 can be either of a resistive or a thermocouple type.

In a variant of the invention which is not illustrated, each thermal-flow sensor device 3 is formed integrally with an associated temperature sensor 4 on a single substrate. In this case, however, the temperature sensor 4 still measures the temperature of the surface facing the environment to be investigated.

In the thermal comfort sensor S, the heater 2 in each measuring device $D_A$ or $D_B$ generates heat with a density of thermal energy per unit area $W/m^2$ corresponding to a given metabolic value. The associated heat flow sensor generates an electric voltage signal indicating the quantity of heat developed by the associated heater 2. The surface of the heat flow sensor 3 reaches a temperature ("skin" temperature) which depends on ambient conditions and which is measured by the associated temperature sensor 4.

It is convenient if the sensor S includes two measuring devices $D_A$ and $D_B$ so that they can simulate different metabolic values (high and low), range being determined between them into which the metabolism of a predetermined majority proportion of the population will fall.

In FIGS. 1 and 2, an air-speed sensor, indicated AS, is carried by the support structure 1 on the same side as the measuring devices $D_A$ and $D_B$, in an intermediate area between these devices. In operation, the sensor AS emits electrical signals indicating the speed of air flowing in its vicinity. This signal is a parameter used to estimate the quantity of water vapour which would evaporate from a human body in sweat.

Figure 3:
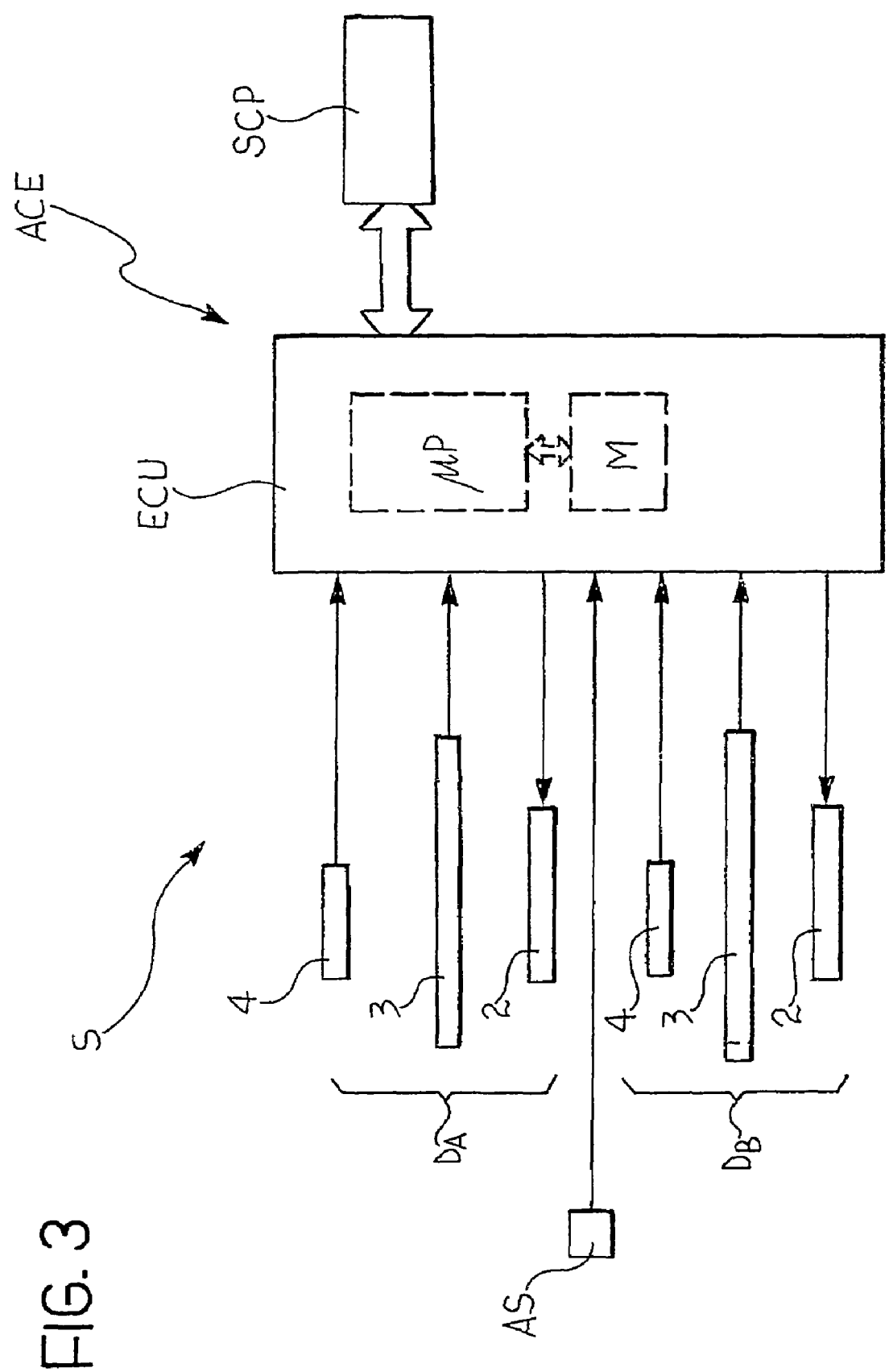
FIG. 3 is a block diagram illustrating the construction of a thermal comfort sensor of the invention.

With reference to FIGS. 1 to 3, an electronic acquisition and control unit, indicated ACE, is physically associated with the thermal comfort sensor S, secured for example to the support structure 1, on the side thereof opposite that carrying the measuring devices $D_A$ and $D_B$ and the sensor AS.

The electronic acquisition and control unit ACE includes, for example, an electronic control unit ECU (FIG. 3) connected to the heaters 2 and to the sensors 3, 4 and AS. The control unit ECU includes amplification devices for amplifying signals emitted by the sensors, a microprocessor $\mu P$ and associated memory devices M. The ECU unit is also connected to a serial communication port SCP which forms part of the electronic acquisition and control unit ACE (FIG. 3) and is provided to enable the sensor S to be in communication with a main unit incorporated in a dummy and communicating with the various thermal comfort sensors arranged in the dummy.

The sensor described above operates substantially as follows.

The main use of the thermal comfort sensor is in simulating the generation of metabolic heat by a portion of the surface of a human body. This simulation of metabolic heat generation is achieved by supplying electric power to the heaters 2 and by using the associated heat flow sensors 3 to control the heat flow generated and thereby ensure that it remains substantially constant.

The unit ECU controls the heaters 2, regulating the power supplied to them in dependence on the heat flow as measured by the associated flow sensors 3. The unit ECU also acquires the temperature values as signaled by the sensors 4. On the basis of the temperature values and heat flow values as reported by the sensors 3, the control unit ECU is able to calculate the value of an "artificial" parameter giving a synthetic indication of thermal comfort, such as the so-called "operating temperature" and the heat exchange coefficient characteristic of the environment in which the simulation is being conducted.

By means of appropriate calibration, it is also possible to calculate the "equivalent temperature", in accordance with the method described in earlier Italian Patent Application 6799-A/85.

It is convenient if calibration data and data on the characteristic pattern of the detector devices $D_A$ and $D_B$ of the sensor are stored in the memory device M of the control unit ECU.

The electronic control unit ECU is in communication, through the communication port SCP, of a serial type for example, with a central control unit which coordinates all the thermal comfort sensors and the air temperatures and air humidity sensors.

Each comfort sensor supplies the data it has measured and can also be controlled to simulate different metabolic conditions (under normal driving conditions, driving under stress and the like), which correspond to different values of thermal energy density generated by the heaters 2.

The electronic acquisition and control unit ACE associated with the sensor S is also operable to adjust the power consumed by the heaters 2 in order to maintain the surface temperature (that is the temperature at the site of the sensors 4) at a substantially constant value. This possibility is especially useful for carrying out measurements in the region of a comfort condition, where it is useful to be able to understand the effect of rapid changes in the environment on heat sensation. This constant-temperature control is intrinsically faster since it is less dependent on thermal inertia and the sensor. The electric power supplied to the heaters 2 can therefore easily be adjusted by means of a closed loop control based on two different temperature thresholds for the two measuring devices $D_A$ and $D_B$.

Figure 4:
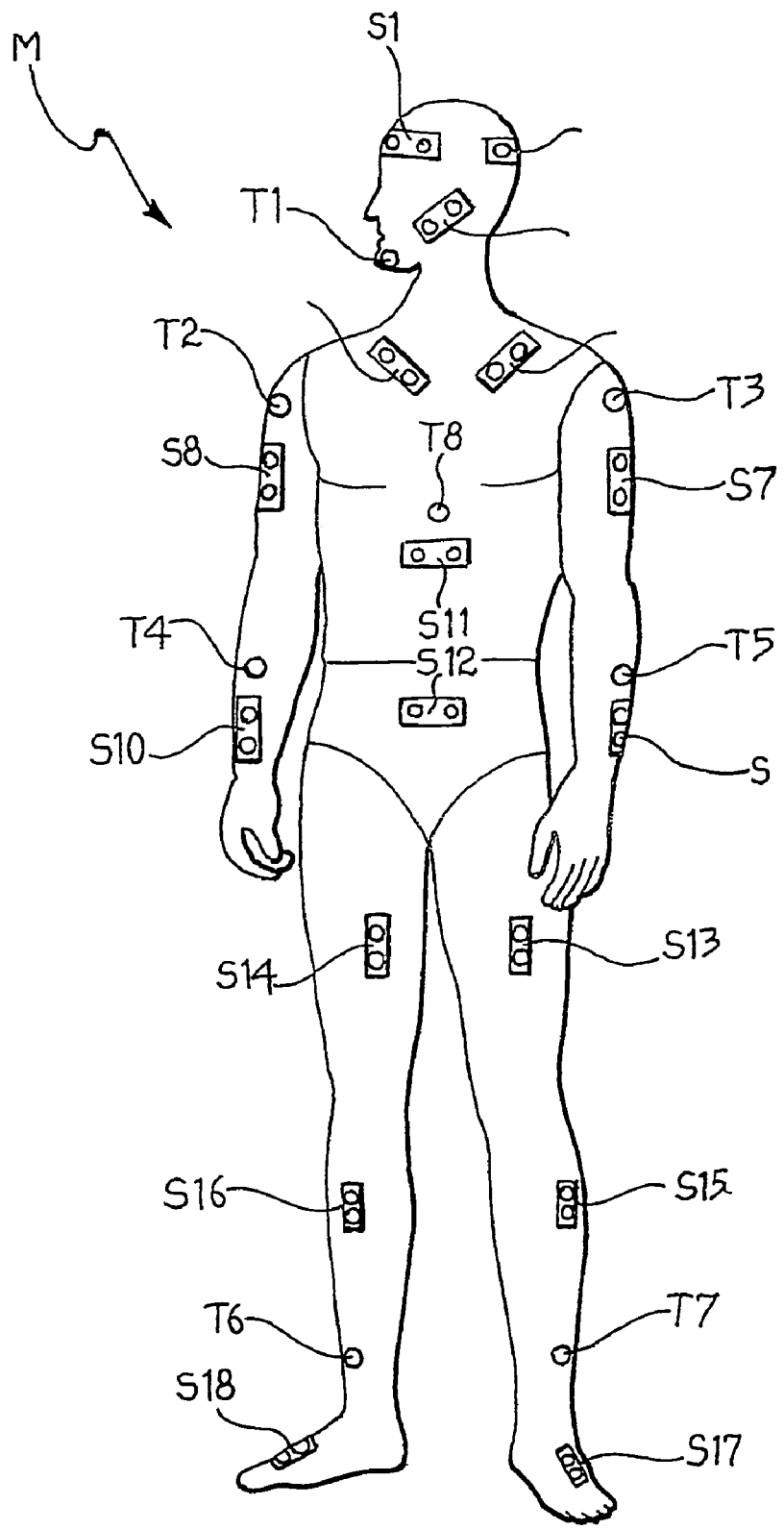
FIG. 4 is a schematic perspective view of an anthropomorphic simulation dummy fitted with a plurality of thermal comfort sensors according to the invention.

In FIG. 4, an anthropomorphic, articulated simulator dummy fitted with a plurality of thermal comfort sensors according to the invention is generally indicated M. In the example shown in FIG. 4, the dummy M has 18 thermal comfort sensors, indicated S1 to S18.

The dummy M illustrated also has a plurality (in particular eight) of temperature and ambient humidity sensors, of a type which are known per se, indicated T1 to T8.

Figure 5:
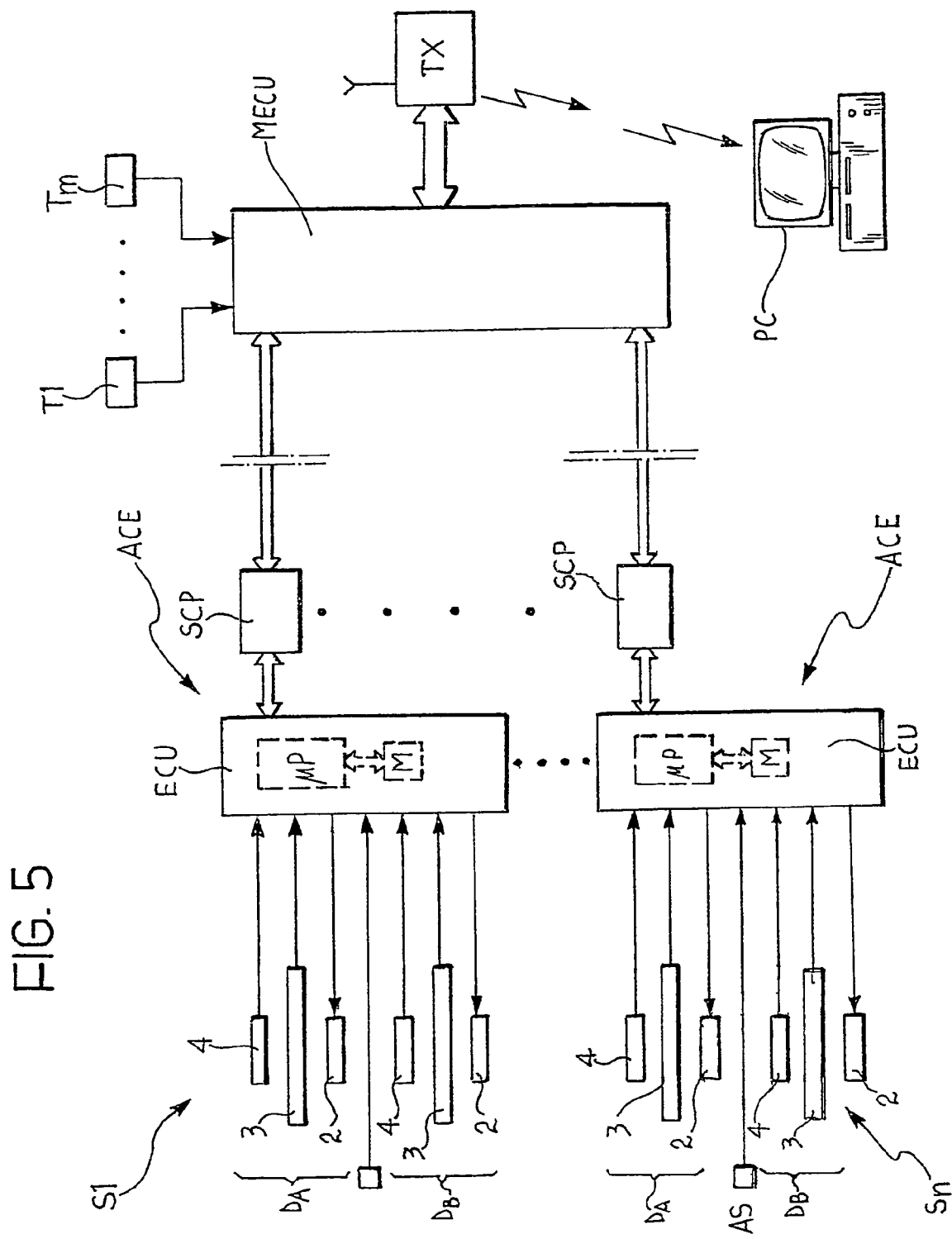
FIG. 5 is a block diagram showing the devices associated with a sensor-fitted dummy according to the invention.

A central control unit (indicated MECU in FIG. 5), with all the thermal comfort sensors (S1÷Sn) and the ambient temperature sensors (T1÷Tm) leading thereto, is incorporated in the dummy M, and is able to communicate with an external processing and control unit, comprising for example, a personal computer PC, by means of a radio communication device TX.

The external computer PC contains data processing software based on a model of human physiology operable to supply thermal comfort indices.

Naturally, the principle of the invention remaining unchanged, embodiments and manufacturing details may vary widely from those described and illustrated here purely by way of non-limitative example, without departing thereby from the scope of the invention as claimed in the appended claims.

The dummy could contain only the comfort sensors, for example, with values of ambient temperature and humidity being estimated by the user.

What is claimed is:

1. A sensor device (S) which includes
   a support structure (1) of a heat insulating material, a measuring area (1*d*; 1*e*) being formed on one side thereof, and having a measuring device (DA, DB) disposed thereon, said measuring device including an electric heater (2) connected to the said structure (1) together with an electronic thermal flow sensor (3) and an associated electric temperature sensor (4), these being arranged above the heater (2) on the opposite side to the structure (1);
   the sensor device (S) also including electronic acquisition and control means (ACE) operable to control the operation of the heater (2) according to predetermined instructions and/or to receive the signals emitted by the aforesaid sensors (3, 4);
   the sensor device (S) being characterised in that it comprises
   a second measuring area (1*e*; 1*d*) formed on the same side of the support structure (1) as the first one (1*d*; 1*e*) and spaced from the first measuring area (1*d*; 1*e*), also the second measuring area (1*e*; 1*d*) having a respective measuring device (DB; DA) disposed thereon; and
   a flow-speed sensor (AS) associated with the said support structure (1) and arranged on the said side of the support structure (1), for supplying during operation electrical signals which indicate the speed of air flowing in the vicinity;
   said flow-speed sensor (AS) being connected to said electronic acquisition and control means (ACE), which are secured to said support structure (1).

2. A sensor device according to claim 1, in which each heater (2) includes a heating resistive element applied to an electrically insulating substrate.

3. A sensor device according to claim 1, in which each thermal flow sensor (3) is of a thermopile type.

4. A sensor device according to claim 1, in which each temperature sensor (4) is either a resistive sensor or a thermocouple sensor.

5. A sensor device according to claim 1, in which the air-flow speed sensor (AS) is of a single direction type.

6. A sensor device according to claim 1, in which the said electronic acquisition and control means (ACE) include memory means (M) operable to store data or information for calibrating the characteristics of the sensor (S).

7. A sensor device according to claim 1, in which the said acquisition and control means (ACE) include a serial communication port (SCP).

8. A sensor device according to claim 1, in which the said acquisition and control means (ACE) are set to control the said heaters (2) so that they generate a thermal flow of a predetermined value which is substantially constant or, selectively, in such a way that the temperature measured by the aforesaid temperature sensors (4) remains substantially constant.

9. A simulator dummy (M), in particular an articulated, anthropomorphic dummy, which includes a plurality of sensor devices according claim 1.

10. A dummy according to claim 9, which also includes a plurality of ambient temperature surface sensors.

* * * * *